US010275687B2

(12) United States Patent
Dey et al.

(10) Patent No.: US 10,275,687 B2
(45) Date of Patent: Apr. 30, 2019

(54) IMAGE RECOGNITION WITH FILTERING OF IMAGE CLASSIFICATION OUTPUT DISTRIBUTION

(71) Applicant: INTERNATIONAL BUSINESS MACHINES CORPORATION, Armonk, NY (US)

(72) Inventors: Prasenjit Dey, Bangalore (IN); Vijay Ekambaram, Tamilnadu (IN); Ravindranath Kokku, Yorktown Heights, NY (US); Nitendra Rajput, Haryana (IN); Ruhi Sharma Mittal, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 147 days.

(21) Appl. No.: 15/434,701

(22) Filed: Feb. 16, 2017

(65) Prior Publication Data
US 2018/0232602 A1    Aug. 16, 2018

(51) Int. Cl.
*G06K 9/00*      (2006.01)
*G06K 9/62*      (2006.01)
(Continued)

(52) U.S. Cl.
CPC ....... *G06K 9/6256* (2013.01); *G06F 17/3028* (2013.01); *G06F 17/30259* (2013.01);
(Continued)

(58) Field of Classification Search
CPC .. G06K 9/4671; G06K 9/6201; G06K 9/6293; G06K 9/00228; G06K 9/00456;
(Continued)

(56) References Cited

U.S. PATENT DOCUMENTS

| 6,763,148 B1 | 7/2004 | Sternberg et al. |
| 8,817,045 B2 | 8/2014 | Cohen |

(Continued)

FOREIGN PATENT DOCUMENTS

| CN | 105608441 A | 5/2016 |
| CN | 106228162 A | 12/2016 |
| CN | 106611193 A | 5/2017 |

OTHER PUBLICATIONS

Ji Wan et al., "Deep Learning for Content-Based Image Retrieval: A Comprehensive Study," Proceedings of the 22nd ACM International Conference on Multimedia (MM 2014), Orlando, Florida, Nov. 3-7, 2014; pp. 157-166.
(Continued)

*Primary Examiner* — Li Liu
(74) *Attorney, Agent, or Firm* — Intelletek Law Group, PLLC; Gabriel Daniel, Esq.

(57) ABSTRACT

Data representing an image is received by an image recognition system. An image recognition system generates an image classification output distribution for a plurality of image features based on analysis of the data representing the image and training data stored for the image recognition system. One or more filters are applied to the image classification output distribution to obtain an updated image classification output distribution. A highest confidence value is selected from the updated image classification output distribution. A selected image feature associated with the highest confidence value is identified from the plurality of image features. Information associated with the selected image feature is obtained from a database and communicated to the user's device by the image recognition system.

20 Claims, 4 Drawing Sheets

(51) Int. Cl.
*G06K 9/66* (2006.01)
*G06K 9/18* (2006.01)
*G06K 9/72* (2006.01)
*G06F 17/30* (2006.01)

(52) U.S. Cl.
CPC .............. *G06K 9/18* (2013.01); *G06K 9/628* (2013.01); *G06K 9/66* (2013.01); *G06K 9/72* (2013.01); *G06K 2209/01* (2013.01)

(58) Field of Classification Search
CPC .......... G06K 9/00536; G06K 9/00624; G06K 9/00671; G06K 9/3241; G06K 9/6267; G06T 2207/20081
See application file for complete search history.

(56) References Cited

U.S. PATENT DOCUMENTS

| | | | |
|---|---|---|---|
| 9,015,093 | B1 | 4/2015 | Commons |
| 9,135,712 | B2 | 9/2015 | Baillo et al. |
| 2002/0114523 | A1* | 8/2002 | Filatov ............... G06K 9/00852 382/229 |
| 2003/0099401 | A1 | 5/2003 | Driggs et al. |
| 2004/0042651 | A1 | 3/2004 | Ii et al. |
| 2005/0189411 | A1* | 9/2005 | Ostrowski ............... A47F 9/045 235/383 |
| 2009/0245573 | A1* | 10/2009 | Saptharishi ........ G06K 9/00771 382/103 |
| 2010/0277772 | A1* | 11/2010 | Destree ............... G06F 17/3028 358/450 |
| 2012/0011142 | A1* | 1/2012 | Baheti .................. G06K 9/4671 707/769 |
| 2015/0063634 | A1* | 3/2015 | Hofman .................... G06K 9/62 382/103 |
| 2015/0088709 | A1 | 3/2015 | Mekala et al. |
| 2016/0189010 | A1 | 6/2016 | Tang et al. |
| 2016/0195569 | A1* | 7/2016 | Carvalho ................ G01P 15/18 702/141 |
| 2017/0103256 | A1* | 4/2017 | Velozo ............... G06K 9/00228 |
| 2017/0103281 | A1* | 4/2017 | Amtrup ................ G06K 9/4671 |

OTHER PUBLICATIONS

Ismael, Chris, "List of 14+ Image Recognition APIs," Website address: http://blog.mashape.com/list-of-14-image-recognition-apis/, Oct. 10, 2013.

Unknown, "Image Recognition," Tensorflow.org website address: https://www.tensorflow.org/versions/r0.10/tutorials/image_recognition/index.html.

International Search Report and Written Opinion from related application PCT/IB2017/057879, dated Apr. 16, 2018; 9 pgs.

* cited by examiner

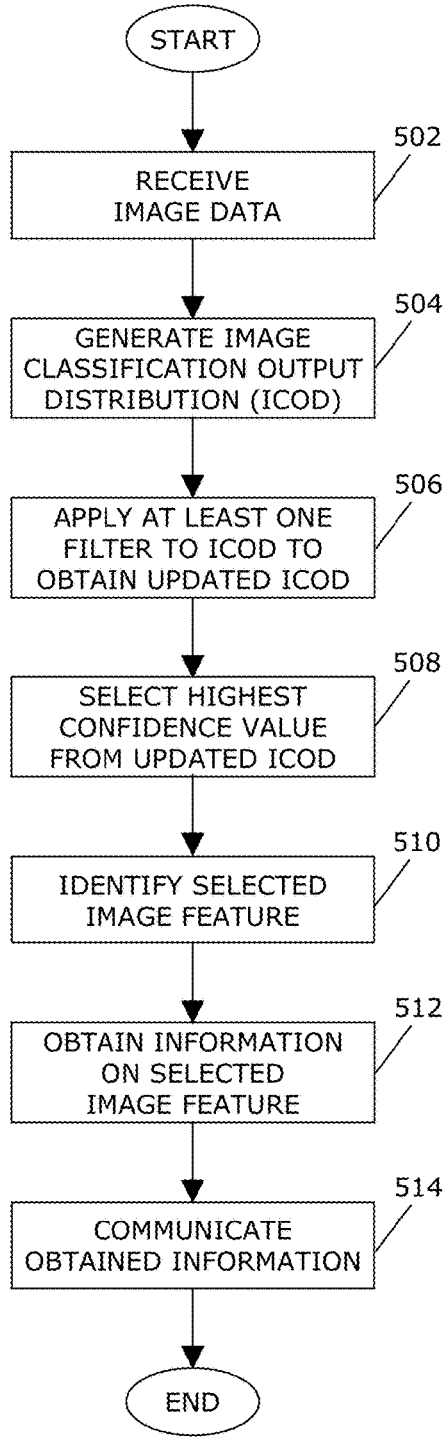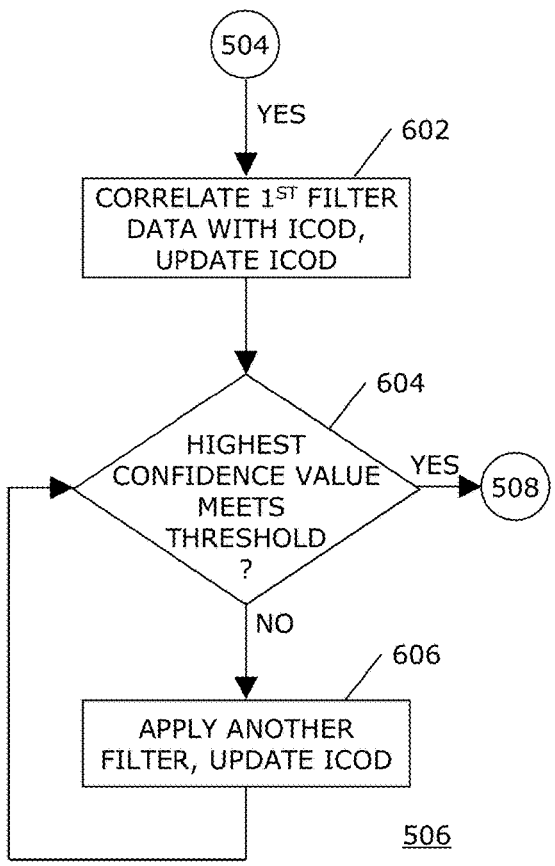
FIG. 5
FIG. 6

IMAGE RECOGNITION WITH FILTERING OF IMAGE CLASSIFICATION OUTPUT DISTRIBUTION

TECHNICAL FIELD

The present application generally relates to image recognition, and more particularly to methods and systems of image recognition in a learning environment.

BACKGROUND

Image recognition systems, also known as object classification systems, analyze data representing an image, also known as image data. Based on the analysis, an image recognition system may output one or more objects or features that may be present in the image. In addition, confidence values or scores for each of the one or more objects or features may also be output. Confidence values, which are numerical values, may range from 0 to 1, where a value of 1 indicate greatest correlation and a value of 0 indicates no correlation. The confidence values in an output distribution may be ranked highest to lowest based on the likelihood that the object or feature is depicted in the image. The confidence values may be utilized to disambiguate the image data into objects or features present in the image. Image recognition systems may utilize rule-based artificial intelligence and information retrieval systems to identify and assign values to candidate objects or features. Image recognition systems may comprise convolutional neural networks or other types of networks that provide the intended results.

SUMMARY

According to one or more embodiments, a method comprises receiving, by an image recognition system, data representing an image and generating, by the image recognition system, an image classification output distribution for a plurality of image features based on analysis of the data representing the image and training data stored for the image recognition system. One or more filters are applied to the image classification output distribution to obtain an updated image classification output distribution. A highest confidence value is selected from the updated image classification output distribution. A selected image feature associated with the highest confidence value is identified from the plurality of image features. Information associated with the selected image feature is obtained from a database. The information associated with the selected image feature is communicated to the user's device by the image recognition system.

According to one or more embodiments, an image recognition system comprises a network adapter configured to receive, from a user's device, data representing an image and to communicate information associated with a selected image feature to the user's device and at least one processor arranged and constructed to: generate an image classification output distribution for a plurality of image features based on analysis of the data representing the image and training data stored for the image recognition system; obtain an updated image classification output distribution for the plurality of image features by applying one or more filters to the image classification output distribution until a highest confidence value of the updated image classification output distribution meets a threshold; identify, from the plurality of image features, the selected image feature associated with the highest confidence value; obtain, from a database, information associated with the first image feature.

According to one or more embodiments, a computer program product for an image recognition system comprises a computer readable storage medium having program instructions embodied therein, wherein the program instructions are executable by a device to cause the device to: receive, by the image recognition system, data representing an image; generate, by an image recognition system, an image classification output distribution for a plurality of image features based on analysis of the data representing the image and training data stored for the image recognition system; obtain by an image recognition system, an updated image classification output distribution for the plurality of image features by applying one or more filters to the image classification output distribution until a highest confidence value of the updated image classification output distribution meets a threshold; identify, from the plurality of image features, a selected image feature associated with the highest confidence value. Applying a first filter comprises correlating the image classification output distribution with data from a classroom syllabus. Applying a second filter comprises correlating the image classification output distribution with a topic of interest from a learner model associated with the user. Applying a third filter comprises correlating the image classification output distribution with a communication between the user and a teacher.

BRIEF DESCRIPTION OF THE DRAWINGS

FIG. 5 is a flowchart illustrating a method of filtering image recognition output in accordance with an exemplary embodiment.

FIG. 6 is a flowchart illustrating a method of applying filters in an image recognition system in accordance with an exemplary embodiment.

DETAILED DESCRIPTION

Figure 1:
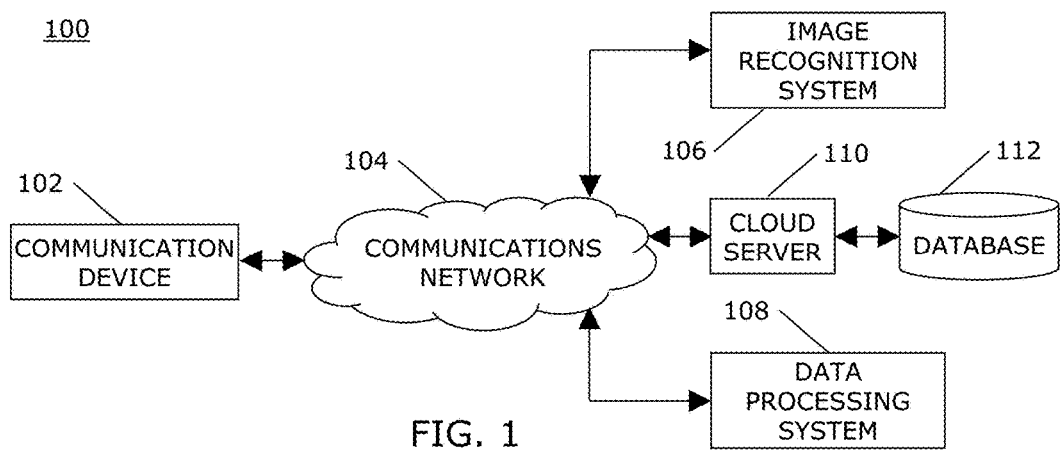
FIG. 1 is a block diagram of a system for image data transmission, image recognition, and filtering in accordance with an exemplary embodiment.

The following describes numerous specific details by way of examples in order to provide a thorough understanding of the relevant teachings. The present teachings may, however, be practiced without such details. In addition, well-known methods, procedures, components, and/or circuitry are described at a relatively high-level, without detail, in order to avoid unnecessarily obscuring aspects of the present teachings.

The one or more embodiments described herein provide an enhancement to image recognition results. The accuracy of the image recognition results depends, for example, on the algorithms utilized for disambiguation, the quality and content of the data stores relied on by the algorithms, and the quality of the image. At times, the highest confidence values for a feature or object are not indicative of the correct feature or object. Accordingly, the concepts disclosed herein improve the quality of the disambiguation of image data into objects or features. Features, as referred to herein, include objects (e.g., books, fruit, boxes, animals, buildings, and so forth), groupings (e.g., face, body, classroom, university, restaurant, grocery store, library, stadium, rain, snowstorm, and so forth), textures (e.g., fuzzy, spiked, smooth, coarse, and so forth), colors (e.g., red, blue, green, and so forth), subsets or subsections (e.g., arms, fingernails, walls, cavities, and so forth), motions (e.g., running, walking, waving, swimming, flying, and so forth), poses (e.g., standing, sitting, sleeping, and so forth), shape (e.g., round, rectangular, curved, trapezoidal, flat, wavy, concentric, blob, and so forth), borders, (e.g., lines, edges, ridges, corners, points, and so forth), and other characteristics of images.

The present application may apply to a system, a method, and/or a computer program product. The computer program product may include a computer readable storage medium or media having computer readable program instructions stored therein for causing a processor to carry out aspects of the present application.

The computer readable storage medium may be a tangible device that retains and stores instructions for use by an instruction execution device. For example, the computer readable storage medium may be, but is not limited to, an electronic storage device, a magnetic storage device, an optical storage device, an electromagnetic storage device, a semiconductor storage device, or any suitable combination thereof. A non-exhaustive list of more specific examples of the computer readable storage medium includes: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as transitory signals per se, such as radio waves or other freely propagating electromagnetic waves, electromagnetic waves propagating through a waveguide or other transmission media, e.g., light pulses passing through a fiber-optic cable, or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present application may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter situation, the remote computer may be connected to a user's computer through any type of network, including a local area network (LAN) or a wide area network (WAN), or the connection may be made to an external computer (for example, through the Internet using an Internet Service Provider). In some embodiments, electronic circuitry, for example, programmable logic circuitry, field-programmable gate arrays (FPGA), or programmable logic arrays (PLA), may execute the computer readable program instructions by utilizing state information of the computer readable program instructions to characterize the electronic circuitry, in order to perform aspects of the present application Aspects of the present application are described herein with reference to flowchart illustrations and/or block diagrams of methods, apparatus (systems), and computer program products according to one or more embodiments. Each element of a flowchart and/or block diagram may be implemented by computer readable program instructions.

The computer readable program instructions may be provided to a processor of a general purpose computer, special purpose computer, or other programmable data processing apparatus to produce a machine, such that the instructions, which execute, via the processor of the computer or other programmable data processing apparatus, implementations of the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions that implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions that execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present application. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A block diagram of a system 100 for image data transmission, image recognition, and filtering is shown in FIG. 1 in accordance with an embodiment. A communication device 102 is typically associated with one or more users. The communication device 102 may be a wireless or wired/wireline, and portable or non-portable. Examples of communication devices 102 include, but are not limited to, cellular phones, smartphones, tablet computers, laptop computers, desktop computers, facsimile machines, wireless organizers, personal digital assistants, pagers, notebook computers, gaming devices, media players, electronic navigation devices, electronic whiteboards, and so forth.

The communications network 104 may be any type of wired, also known as wireline, or wireless network, including, but not limited to, data networks, voice networks, and networks that support both voice and data communications. The communications network 104 may comprise copper wires, optical fibers, wireless transmission, routers, firewalls, switches, gateway computers, and/or edge servers, separately or in any combination. The communications network may include, for example, the Internet, one or more local area networks, and one or more wide area networks.

Figure 2:
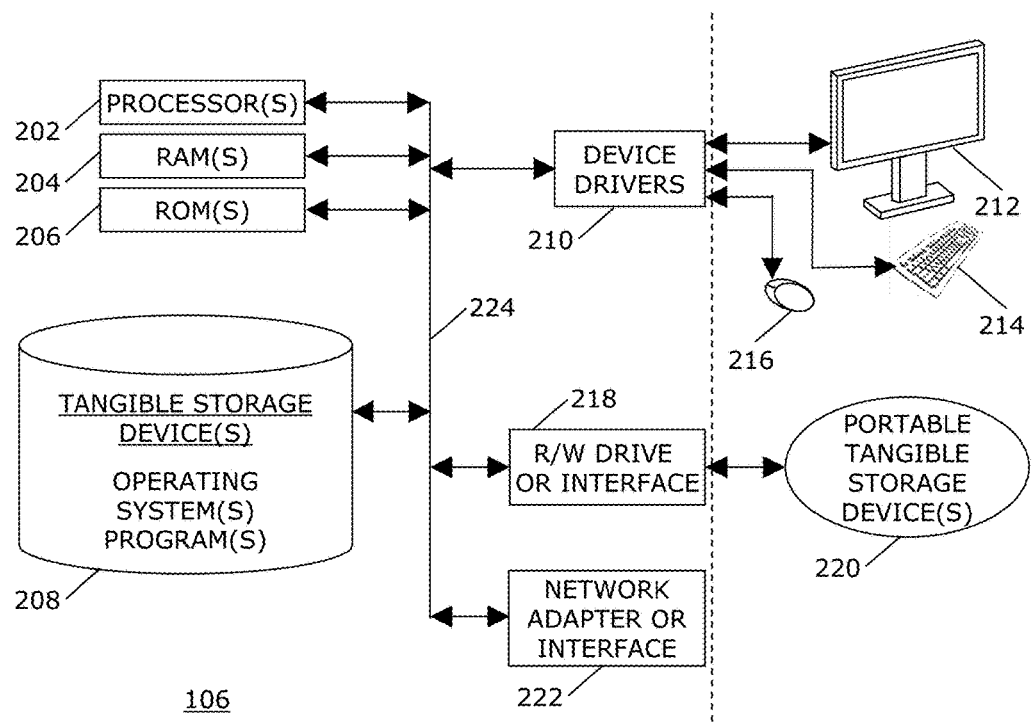
FIG. 2 is a block diagram of a data processing system in accordance with an exemplary embodiment.

An image recognition system 106, for example, as described with respect to FIG. 2, is a data processing system that is interfaced with the communications network 104. The image recognition system 106 may be, for example, an IBM Watson® visual recognition system. The system 100 may optionally include another data processing system 108, a cloud server 110, and/or a database 112 that the image recognition system 106 may utilize to store or access information for use in analyzing data representing an image in order to identify one or more objects or features in an image. The other data processing system 108 may have a similar structure or architecture as the image recognition system 106.

A block diagram of an image recognition system 106 in accordance with an embodiment is shown in FIG. 2. FIG. 2 provides only an illustration of one implementation and does not imply any limitations with regard to the environments in which different embodiments may be implemented. Many modifications to the depicted embodiment may be made, for example, based on design and implementation specifications.

The image recognition system 106 may be implemented in any electronic device capable of executing machine-readable program instructions, which may be referred to as a data processing system. The image recognition system 106 may be a smart phone, a computer system, PDA, or other electronic devices. Examples of computing systems, environments, and/or configurations in which the image recognition system 106 may be implemented include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The image recognition system 106 may include may include internal components, to the left of the dashed vertical line, and external components, to the right of the dashed vertical line, as illustrated in FIG. 2. The internal components include one or more processors 202, one or more computer-readable Random Access Memory devices (RAMs) 204, and one or more computer-readable Read Only Memory devices (ROMs) 206, and one or more computer-readable tangible storage devices 208 including one or more operating systems and one or more programs, all communicating over one or more buses 224. The operating system(s) and program(s), such as the image recognition program and filtering program, are stored on the computer-readable tangible storage device(s) 208 for execution by the processor(s) 202 via the RAM(s) 204, which typically include cache memory. The computer-readable tangible storage device(s) 208 may be, for example, a magnetic disk storage device of an internal hard drive. Alternatively, one or more of the computer-readable tangible storage devices 208 may be a semiconductor storage device such as ROM 206, EPROM, flash memory, or any other computer-readable tangible storage device that stores a computer program and digital information.

The internal components also include a R/W drive or interface 218 that reads from and writes to one or more portable computer-readable tangible storage devices 220 such as a CD-ROM, DVD, memory stick, magnetic tape, magnetic disk, optical disk or semiconductor storage device. The image recognition program and filtering program may be stored on one or more of the portable computer-readable tangible storage devices 220, read via the R/W drive or interface 218, and loaded into the computer-readable tangible storage device(s) 208.

The internal components may also include network adapters, also known as switch port cards, or interfaces 222 such as a TCP/IP adapter cards, wireless Wi-Fi interface cards, 3G or 4G wireless interface cards, or other wired or wireless communication links. The image recognition program and filtering program may be downloaded from an external computer, e.g., a server, via the communications network 104 and the network adapters or interfaces 222. From the network adapters or interfaces 222, the image recognition program and filtering program may be loaded into the tangible storage device 208.

The external components may include a computer display monitor 212, a keyboard 214, and a computer mouse 216. The external components may also include touch screens, virtual keyboards, touch pads, pointing devices, and other human interface devices. The internal components also include device drivers 210 that interface to the computer display monitor 212, keyboard 214, and computer mouse 216. The device drivers 210, R/W drive or interface 218, and network adapter or interface 222 are implemented in hardware and software stored in the tangible storage device 209 and/or ROM 206.

Figure 3:
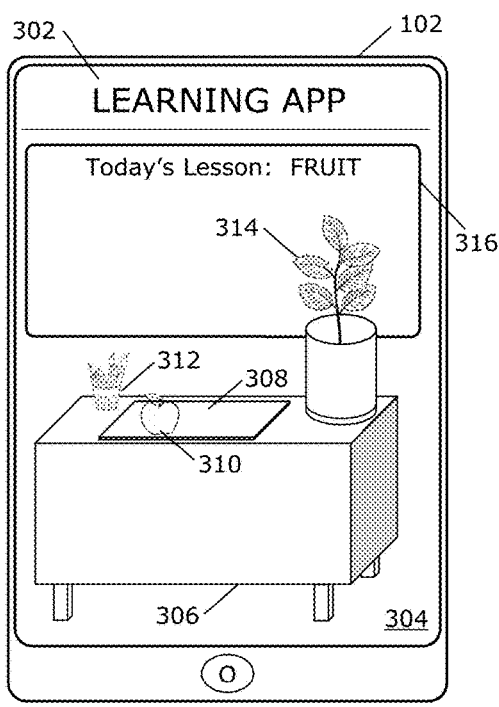
FIG. 3 and FIG. 4 are views of information displayed on a communication device in accordance with an exemplary embodiment.
Figure 4:
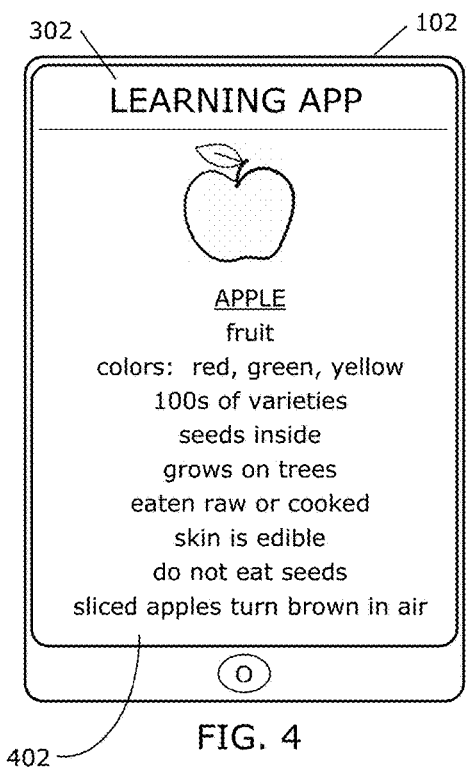

Views of information displayed on a communication device in accordance with an embodiment are shown in FIG. 3 and FIG. 4. The user, who may be a student such as a child, has a communication device 102 that is a tablet computer in this example. The user causes the communication device 102 to display a learning application 302, such as shown in FIG. 3. The learning application facilitates the user taking a picture or image 304 that is transmitted to an image recognition system. Based on an object or feature in the image 304, information 402 is received and displayed, such as shown in FIG. 4.

As shown in FIG. 3, the image 304 is displayed, including a desk 306, on which a printed syllabus 308, an apple 310, a pen/pencil holder 312, and a plant 314 are placed, and a whiteboard/blackboard 316 on which the letters, "Today's Lesson: FRUIT," appear. The image recognition system 106 attempts to identify the various objects or features in the image 304, filters the image by applying one or more filters to the image recognition output, and communicates information on one of the objects or features to the user's communication device 102. In this example, an apple 310 is selected as the target feature. Information 402 regarding apples is obtained and communicated to the user's tablet 102 for display via the learning application 302.

A flowchart illustrating a method of filtering image recognition output in accordance with an embodiment is shown in FIG. 5. Image data, also referred to as data representing an image, for example, the image 304, is received 502 by the image recognition system 106 from a user's device 102. The image recognition system 106 processes and analyzes the image data with one or more image recognition algorithms. The image recognition system 106 generates 504 an image classification output distribution for a plurality of image features based on analysis of the image data and training data stored for the image recognition system 106.

Training data is utilized by the image recognition system 106 to learn about different objects or features in each image class. For example, numerous images of various objects may be entered in the image recognition system 106, and the characteristics of the objects are analyzed and stored as training data. For example, one class may comprise round objects, such as balls, apples, oranges, ornaments, and so forth. Training data distinguishing one object/feature from another object/feature in the class is stored, such as color, texture, size, variations or deviations in shape, and so forth. The training data may be stored locally in the image recognition system 106 or accessed via the communications network 104 from a non-local store, such as in another data processing system 108 or a database 112 of a cloud server 110.

The image recognition system 106 finds the closest mapping or correlation between features of a received image and candidate or potential features from stored training data. A confidence value or score is associated with each candidate feature. A confidence value, for example, reflects how "confident" the image recognition algorithm has identified an object from the image as an object from a class of trained data. Confidence values range from 0 to 1, with higher values indicating greater correlation.

The image classification output distribution (ICOD) may comprise a first image feature associated with a first confidence value and a second image feature associated with a second confidence value, and so forth. For example, the ICOD may include five image features and five associated confidence values. For the example of FIG. 3, the ICOD may comprise apple (0.92), ball (0.65), orange (0.21), sun (0.15), and melon (0.05), with confidence values shown in parentheses.

One or more filters are applied 506 to the image classification output distribution to obtain an updated image classification output distribution. For example, when a filter is applied, the confidence values are adjusted to obtain an updated ICOD. Alternatively or additionally, the objects or features in the ICOD may be changed. Applying a filter includes correlating filter data with an ICOD to obtain an updated ICOD. See FIG. 6 for more detail regarding applying filters 506.

Various filters include one or more of optical character recognition (OCR) as performed on text in the image 304, data from a classroom syllabus, a topic of interest in a learner model, communications between a teacher and a student, a classroom context, a student context, a teacher context, a user's location, an environment of the image, and so forth. For example, the text identified by optical character recognition may be correlated with the ICOD.

Classroom & Student Context

A flowchart illustrating a method of applying filters 506 in an image recognition system is shown in FIG. 6. First filter data is correlated 602 with the ICOD to obtain an updated ICOD. Information/data relating to the filters may be received via the communication network 104.

In the example of FIG. 3, when the first filter is OCR, optical character recognition is performed on the image data to obtain recognized text, and the recognized text, "Today's Lesson: FRUIT" in this example, may be the data correlated 602 to adjust the ICOD to apple (0.98), orange (0.31), ball (0.15), melon (0.11), and sun (0.05), by reducing confidence values for non-fruit objects/features and increasing confidence values for objects/features that are fruit. Thus, one example of a filter correlates OCR output with the image classification output distribution.

When the first filter is a classroom syllabus, the syllabus is obtained from the user's device, a device of a teacher associated with the user, a device of a school associated with the user, or other syllabus data stored in association with the user. For example, a list of lessons may be obtained from the syllabus for the current date and time. In this example, "fruit growing on trees" is listed in the syllabus. Information concerning fruit growing on trees is correlated 602 to adjust the ICOD to apple (0.98), orange (0.31), ball (0.15), melon (0.01), and sun (0.05), by reducing confidence values for non-fruit objects/features that are not on trees growing fruit and increasing confidence values for objects/features that are on trees growing fruit.

When the first filter is a learner model, the learner model is obtained from the user's device, a device of a teacher associated with the user, a device of a school associated with the user, or learning data stored in association with the user. The learner model may include topics of interest, for example, lessons learned by the user, lessons desired to be learned by the user, subject matter the user has looked up on the Internet, photos taken, words entered by the user, and so forth. In this example, the learner model identifies fruits and vegetables as a topic of interest. Information concerning fruits and vegetables is correlated 602 to adjust the ICOD to apple (0.98), orange (0.31), tomato (0.15), melon (0.11), and ball (0.05), by reducing confidence values for non-fruit/vegetable objects/features and increasing confidence values for objects/features that are fruits/vegetables. In this example, sun is replaced by tomato in the list of top correlated objects/features.

When the first filter comprises communications between a teacher and the user, who may be a student, and, for example, the user texts the teacher with a question, "what is the red thing on your desk." Information concerning red objects is correlated 602 to adjust the ICOD to apple (0.98), ball (0.35), orange (0.12), melon (0.05), and sun (0.01), by reducing confidence values for non-red objects/features and objects/features that are not found on a teacher's desk and increasing confidence values for objects/features that are on red and may be found on a teacher's desk.

When the first filter comprises a user's location, the location is obtained, for example, from GPS data of the communication device 102, e.g., a school, or inferred from the environment of the image, e.g., a classroom. Information concerning a school or classroom is correlated to adjust the ICOD to apple (0.98), ball (0.40), orange (0.12), melon (0.05), and sun (0.01), by reducing confidence values for objects/features that are not found on in a school or classroom and increasing confidence values for objects/features that may be found in a school or classroom.

More than one filter may be applied 606 to the ICOD. For example, when the ICOD output is a tablet computer (0.86), a laptop (0.80), and a mobile phone (0.72), attempting to accurately distinguish which confidence value is the best for the image by either utilizing an absolute confidence value or a difference value will not provide great certainty or accuracy in the result. Applying one more filters to modify or adapt the ICOD results in a updated ICOD that may include one or more different confidence values, one or more different features/objects, and a different ordering of the features/objects, and so forth. When multiple filters are applied, they may be applied in any order. In one embodiment, one or more filters may be successively applied until the highest confidence value for the ICOD or updated ICOD meets a threshold. In another embodiment, when the highest confidence value fails to meet a threshold, at least one additional filter may be applied to the image classification output distribution to obtain the updated image classification output distribution. For example, one or more additional filters may be applied until the highest confidence value meets the threshold.

The threshold may be, for example, a predetermined numerical value. The threshold may be met 604 when the highest confidence value of the ICOD or updated ICOD meets a predetermined numerical value or absolute value, for example, 0.90, 0.95, 0.99, and so forth. Alternatively, the threshold may be a difference value or other variation between confidence values. In this embodiment, the threshold may be met 604 when the highest confidence value is greater than or equal to the second highest confidence value of the ICOD or updated ICOD by the difference value. The difference between the highest confidence value and the second highest confidence value is greater than or equal to the difference value, for example, 0.5, 0.6, 0.7, and so forth. Meeting a threshold includes equaling the threshold and exceeding the threshold. Upon determining that the threshold is not met at 604, the process continues at 606. Upon determining that the threshold is met at 604, the process continues at 508.

As shown in FIG. 5, a highest confidence value is selected 508 from the updated image classification output distribution. A selected image feature associated with the highest confidence value is identified 510 from the plurality of image features. Information associated with the selected image feature is obtained 512 from a database and is communicated 514, by the image recognition system, to the user's device. Alternatively, identification of more than one feature may be communicated to the user's device, for example, for selection by the user of one of the features. In each of the above examples, the highest confidence value was associated with an apple, thus information associated with an apple 402 is obtained 512 from any database, as appropriate, and communicated to the user's device 102, where this information is displayed, e.g., by the learning app, such as shown in FIG. 4. The information may be communicated through the communications network 104 by the image recognition system 106 or may be communicated to the device 102 by another data processing system 108 or a cloud server 110.

Figure 7:
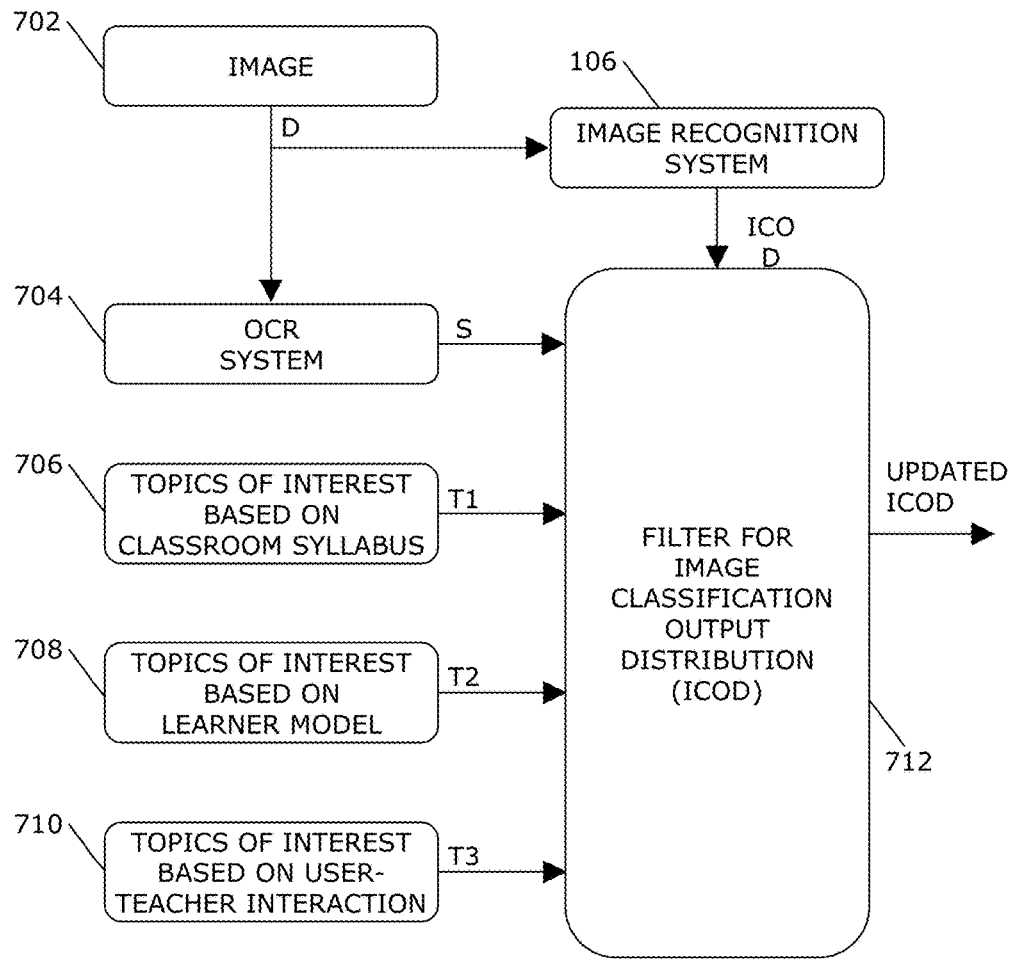
FIG. 7 is a data flow diagram in accordance with an exemplary embodiment.

A data flow diagram in accordance with an embodiment is shown in FIG. 7. Image data, D, representing an image 702 is communicated to the image recognition system 106 and an OCR system 704. The image recognition system 106 generates an ICOD based on the image data and communicates the ICOD to the filter 712. The ICOD includes labels L for each of the image features in the ICOD. Recognized text, S, from the OCR system 704 is input to the filter 712.

A store 706 including topics of interest based on a classroom syllabus outputs topics T1 to the filter 712. A store 708 including topics of interest based on a learner model outputs topics T2 to the filter 712. A store 710 including topics of interest based on user-teacher communications or interactions outputs topics T3 to the filter 712. Based on the semantic correlation of <ICOD> and <S>, <ICOD> and <T1>, <ICOD> and <T2>, <ICOD> and <T3>, the confidence score of one or more features in the ICOD is adjusted, fine-tuned, or enhanced.

For example, a neural probabilistic language model may be trained with T1, T2, and T3 to understand the semantic meaning of these words in a classroom context. <S>, <T1>, <T2>, <T3>, and <L> may be represented as semantic vectors and distance correlation may be performed among the vectors to apply the various filters. When a neural probabilistic language model is utilized, the context or semantic meaning of words is known or understood, and words are plotted in N-d space. Similar words are plotted closer in N-d space, where N is the vector size of the word representation and d represents distance. For example, the word "test case" lies close to the word "test script" in N-d space. The word "testing" lies closer to both the word "test case" and the word "test script," but the distance between "test case" and the word "test script" is closer than the distance between "test case" and the word "testing."

The words in associated with a filter, for example, T1, T2, and T3, may be identified and correlated and added to the model, which process may be referred to as training. More words may be added to the filter, for example, as more knowledge is learned. Given any two words, the model may be utilized to determine whether they are semantically the same or different in accordance with a filter, e.g., T1, T2, T3, and so forth. For example, when the filter is a classroom context, two identified words will be identified as semantically the same or different in a classroom domain. Words from the ICOD and OCR output S are converted to a neural embedding representation, or distributed representation, in accordance with the neural probabilistic language model. The neural embedding representation is utilized to find the correlation between words. Based on the semantic correlation of <ICOD> and <S>, <ICOD> and <T1>, <ICOD> and <T2>, <ICOD> and <T3>, the confidence score of one or more features in the ICOD is adjusted, fine-tuned, or enhanced.

In one example, a child sends an image showing an orange having a distributor name, TANGORE, printed on the outside of its peel. The ICOD output is ball (0.78), lemon (0.69), orange (0.62), and globe (0.01). From this week's classroom syllabus, "fruits and vegetables" are listed as the topic of an exam, and the filter is predicted to be "fruits" (T1). The child's learner model suggests that the child is interested in learning about citrus fruits (T2). The teacher and child discussed topics of interest as animals, fruits, and vegetables (T3). The OCR output S is "tangerine" and "Tangore." When the ICOD and S are represented as vectors, "tangerine" lies close to "orange" because tangerines are related to mandarin oranges, and "Tangore" lies close to "orange" because Tangore is a company that distributes oranges. The semantic correlation between T1 (fruits), T2 (citrus fruits), T3 (animals, fruits and vegetables) and "orange" and "lemon" is higher than the correlation with "ball" or "globe." Utilizing the semantic correlation of <ICOD> and <S>, <ICOD> and <T1>, <ICOD> and <T2>, <ICOD> and <T3>, the confidence values of the ICOD are updated, and the final ICOD is orange (0.95), lemon (0.31), ball (0.02), and globe (0.001). Orange may be confidently identified as the object or feature of the image based on either a high absolute value of the highest confidence value (0.95) or a difference value (0.64).

In other examples based on the image 304 in FIG. 3, the ICOD may comprise pen/pencil holder (0.5), apple (0.5), plant (0.5), and desk (0.5). When the OCR filter is applied, the updated ICOD may be apple (0.95), pen/pencil holder (0.05), plant (0.05), and desk (0.05), and the apple is selected as the selected image feature associated with the highest confidence value. When the classroom syllabus filter is applied, and "plants and trees" is listed in the syllabus for this date and time, the updated ICOD may be plant (0.95), apple (0.25), desk (0.15), and pen/pencil holder (0.05), and the plant is selected as the selected image feature associated with the highest confidence value.

When the learner model filter is applied, and "containers" is listed as a topic of interest, the updated ICOD may be pen/pencil holder (0.75), desk (0.75), plant (0.25), and apple (0.05). Another filter, communications between a teacher and a student-user, may be applied. In this example, the student-user texts the teacher with a question, "can we talk about wooden objects," and the updated ICOD may be desk (0.90), pen/pencil holder (0.65), plant (0.15), apple and (0.05), and the desk is selected as the selected image feature associated with the highest confidence value.

In one example, a method comprises receiving, by an image recognition system, data representing an image and generating, by the image recognition system, an image classification output distribution for a plurality of image features based on analysis of the data representing the image and training data stored for the image recognition system. One or more filters are applied to the image classification output distribution to obtain an updated image classification output distribution. A highest confidence value is selected from the updated image classification output distribution. A selected image feature associated with the highest confidence value is identified from the plurality of image features. Information associated with the selected image feature is obtained from a database. The information associated with the selected image feature is communicated, by the image recognition system, to the user's device.

Upon determining that the highest confidence value fails to meet a threshold, two or more filters may be applied to the image classification output distribution to obtain the updated image classification output distribution. Upon determining that the highest confidence value fails to meet a threshold, three or more filters may be applied to the image classification output distribution to obtain the updated image classification output distribution. The threshold may comprise a difference value between the highest confidence value and a second highest confidence value of the updated image classification output distribution. The image classification output distribution may comprise a first set of confidence values, and applying the one or more filters adjusts at least one confidence value of the first set of confidence values. The image classification output distribution may comprise a first set of image features, and the updated image classification output distribution may comprises a second set of image features, wherein the first set of image features is different from the second set of image features. The user may be a student, and the filter(s) may comprise at least one of: data from a classroom syllabus, a topic of interest from a learner model, information communicated between a teacher and the student, and the user's location. The filter(s) may comprise at least one of: a classroom context, a student context, and a teacher context. Information relating to the filter(s) may be received via a communication network. The image classification output distribution may comprise a first image feature associated with a first confidence value and a second image feature associated with a second confidence value, and applying the one or more filters adjusts at least one of the first confidence value and the second confidence value. The image classification output distribution may comprise a first set of confidence values, and applying the one or more filters adjusts at least one confidence value of the first set of confidence values. Optical character recognition may be performed on the data representing the image to obtain recognized text, and the recognized text may be correlated with the image classification output distribution.

In another example, an image recognition system comprises a network adapter configured to receive, from a user's device, data representing an image and to communicate information associated with a selected image feature to the user's device. At least one processor is arranged and constructed to: generate an image classification output distribution (ICOD) for a plurality of image features based on analysis of the data representing the image and training data stored for the image recognition system; obtain an updated image classification output distribution for the plurality of image features by applying one or more filters to the image classification output distribution until a highest confidence value of the updated image classification output distribution meets a threshold; identify, from the plurality of image features, the selected image feature associated with the highest confidence value; and obtain, from a database, information associated with the first image feature.

The at least one processor may be further arranged and constructed to perform optical character recognition on the data representing the image to obtain recognized text and correlate the recognized text with the image classification output distribution. The image classification output distribution may comprise a first image feature associated with a first confidence value and a second image feature associated with a second confidence value, wherein applying the one or more filters adjusts the first confidence value and the second confidence value. The image classification output distribution may comprise a first set of confidence values, and applying the one or more filters adjusts at least one confidence value of the first set of confidence values. The at least one processor may be further arranged and constructed to, when the highest confidence value fails to meet a threshold, apply two or more filters to the image classification output distribution to obtain the updated image classification output distribution. The at least one processor may be further arranged and constructed to, when the highest confidence value fails to meet a threshold, apply three or more filters to the image classification output distribution to obtain the updated image classification output distribution. The image classification output distribution may comprise a first set of confidence values, and applying the one or more filters adjusts at least one confidence value of the first set of confidence values. The user may be a student, and the filter(s) may comprise at least one of: data from a classroom syllabus, a topic of interest from a learner model, information communicated between a teacher and the student, and the user's location. The filter(s) may comprise at least one of: a classroom context, a student context, and a teacher context. The at least one processor may be further arranged and constructed to receive, via a communication network, information relating to the filter(s).

In another example, a computer program product for an image recognition system comprises a computer readable storage medium having program instructions embodied therein, wherein the program instructions are executable by a device to cause the device to: receive, by the image recognition system, data representing an image; generate, by the image recognition system, an image classification output distribution for a plurality of image features based on analysis of the data representing the image and training data stored for the image recognition system; obtain, by the image recognition system, an updated image classification output distribution for the plurality of image features by applying a first filter to the image classification output distribution; successively apply, by the image recognition system, at least one additional filter to the updated image classification output distribution until a highest confidence value of the updated image classification output distribution meets a threshold; and identify, from the plurality of image features, a selected image feature associated with the highest confidence value that meets the threshold. Applying a first filter may comprise correlating the image classification output distribution with a classroom syllabus. Applying a second filter may comprise correlating the image classification output distribution with a learner model associated with the user. Applying a third filter may comprise correlating the image classification output distribution with a communication between the user and a teacher.

The program instructions executable by the device may further cause the device to obtain, from a database, information associated with the selected image feature, and communicate the information associated with the selected image feature to the user's device. The image classification output distribution may comprise a first image feature associated with a first confidence value and a second image feature associated with a second confidence value, and applying the one or more filters adjusts at least one of the first confidence value and the second confidence value. The image classification output distribution may comprise a first set of confidence values, and applying the one or more filters adjusts at least one confidence value of the first set of confidence values. The program instructions may further cause the device to perform optical character recognition on the data representing the image to obtain recognized text and correlate the recognized text with the image classification output distribution.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

The terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements, but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract is provided to allow a reader to quickly ascertain the nature of the technical disclosure. The Abstract is submitted with the understanding that the Abstract will not be used to interpret or limit the scope or meaning of the claims. In the foregoing Detailed Description, various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method comprising:
    receiving, by an image recognition system, data representing an image;
    generating, by the image recognition system, an image classification output distribution for a plurality of image features, each feature having a confidence value, based on analysis of the data representing the image and training data stored for the image recognition system;
    successively applying one or more different filters to the image classification output distribution to obtain an updated image classification output distribution until a highest confidence value for the image classification output distribution meets a threshold;
    selecting the highest confidence value from the updated image classification output distribution;
    identifying, from the plurality of image features, a selected image feature associated with the highest confidence value;
    obtaining, from a database, information associated with the selected image feature; and
    communicating, by the image recognition system, the information associated with the selected image feature to a user's device.

2. The method of claim 1,
    wherein the image classification output distribution comprises a first set of image features,
    wherein the updated image classification output distribution comprises a second set of image features, and
    wherein the first set of image features is different from the second set of image features.

3. The method of claim 1,
    wherein the image classification output distribution comprises a first set of confidence values, and
    wherein applying the one or more filters adjusts at least one confidence value of the first set of confidence values.

4. The method of claim 1, further comprising, upon determining that the highest confidence value fails to meet a threshold, applying two or more filters to the image classification output distribution to obtain the updated image classification output distribution.

5. The method of claim 4, wherein the threshold comprises a difference value between the highest confidence value and a second highest confidence value of the updated image classification output distribution.

6. The method of claim 1, wherein the one or more filters comprise at least one of: data from a classroom syllabus, a topic of interest from a learner model, information communicated between a teacher and a student, and a location of the student.

7. The method of claim 1, further comprising:
performing optical character recognition on the data representing the image to obtain recognized text; and
correlating the recognized text with the image classification output distribution.

8. The method of claim 1, further comprising receiving, via a communication network, information relating to the one or more filters.

9. An image recognition system comprising:
a network adapter configured to receive, from a user's device, data representing an image and to communicate information associated with a selected image feature to the user's device;
at least one processor arranged and constructed to:
generate an image classification output distribution for a plurality of image features, each feature having a confidence value, based on analysis of the data representing the image and training data stored for the image recognition system;
obtain an updated image classification output distribution for the plurality of image features by successively applying one or more different filters to the image classification output distribution until a highest confidence value of the updated image classification output distribution meets a threshold;
identify, from the plurality of image features, the selected image feature associated with the highest confidence value; and
obtain, from a database, information associated with the selected image feature.

10. The image recognition system of claim 9, wherein the at least one processor is further arranged and constructed to perform optical character recognition on the data representing the image to obtain recognized text, and correlate the recognized text with the image classification output distribution.

11. The image recognition system of claim 9, wherein the image classification output distribution comprises a first image feature associated with a first confidence value and a second image feature associated with a second confidence value, and wherein applying the one or more filters adjusts at least one of the first confidence value and the second confidence value.

12. The image recognition system of claim 9, wherein the at least one processor is further arranged and constructed to, when the highest confidence value fails to meet a threshold, apply two or more filters to the image classification output distribution to obtain the updated image classification output distribution.

13. The image recognition system of claim 9,
wherein the image classification output distribution comprises a first set of confidence values, and
wherein applying the one or more filters adjusts at least one confidence value of the first set of confidence values.

14. The image recognition system of claim 9, wherein the one or more filters comprise at least one of: data from a classroom syllabus, a topic of interest from a learner model, information communicated between a teacher and a student, and a location of the user.

15. The image recognition system of claim 9, wherein the one or more filters comprise at least one of: a classroom context, a student context, and a teacher context.

16. A computer program product for an image recognition system, the computer program product comprising a computer readable storage medium having program instructions embodied therein, wherein the program instructions are executable by a device to cause the device to:
receive, by the image recognition system, data representing an image;
generate, by the image recognition system, an image classification output distribution for a plurality of image features, each feature having a confidence value, based on analysis of the data representing the image and training data stored for the image recognition system;
obtain, by the image recognition system, an updated image classification output distribution for the plurality of image features by applying a first filter to the image classification output distribution;
successively apply, by the image recognition system, at least one additional filter to the updated image classification output distribution until the highest confidence value of the updated image classification output distribution meets a threshold; and
identify, from the plurality of image features, a selected image feature associated with the highest confidence value that meets the threshold.

17. A computer program product of claim 16, wherein the program instructions further cause the device to obtain, from a database, information associated with the selected image feature, and communicate the information associated with the selected image feature to a user's device.

18. The computer program product of claim 16, wherein the image classification output distribution comprises a first image feature associated with a first confidence value and a second image feature associated with a second confidence value, and wherein applying the one or more filters adjusts at least one of the first confidence value and the second confidence value.

19. The computer program product of claim 16,
wherein applying a first filter comprises correlating the image classification output distribution with data from a classroom syllabus;
wherein applying a second filter comprises correlating the image classification output distribution with topic of interest from a learner model associated with a user; and
wherein applying a third filter comprises correlating the image classification output distribution with a communication between the user and a teacher.

20. The computer program product of claim 16, wherein the program instructions further cause the device to perform optical character recognition on the data representing the image to obtain recognized text and to correlate the recognized text with the image classification output distribution.

* * * * *